(12) United States Patent
Chatterji et al.

(10) Patent No.: US 8,557,036 B1
(45) Date of Patent: Oct. 15, 2013

(54) SETTABLE COMPOSITIONS COMPRISING WOLLASTONITE AND PUMICE AND METHODS OF USE

(71) Applicant: Halliburton Energy Services, Inc., Houston, TX (US)

(72) Inventors: Jiten Chatterji, Duncan, OK (US); D. Chad Brenneis, Marlow, OK (US); Crystal L. Keys, Indiahoma, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/672,837

(22) Filed: Nov. 9, 2012

(51) Int. Cl.
*C04B 14/04* (2006.01)
*E21B 33/13* (2006.01)
*E21B 33/14* (2006.01)

(52) U.S. Cl.
USPC ............ 106/470; 106/612; 106/705; 106/710

(58) Field of Classification Search
USPC .................................. 106/470, 612, 705, 710
See application file for complete search history.

(56) References Cited

U.S. PATENT DOCUMENTS

| | | | |
|---|---|---|---|
| 4,462,835 A * | 7/1984 | Car | 106/602 |
| 5,346,012 A | 9/1994 | Heathman | |
| 5,421,409 A | 6/1995 | Mueller et al. | |
| 6,145,591 A | 11/2000 | Boncan | |
| 6,230,804 B1 | 5/2001 | Mueller | |
| 6,508,305 B1 | 1/2003 | Brannon | |
| 6,626,243 B1 | 9/2003 | Boncan | |
| 6,729,405 B2 | 5/2004 | DiLullo | |
| 6,832,652 B1 | 12/2004 | Dillenbeck | |
| 7,156,173 B2 | 1/2007 | Mueller | |
| 7,178,597 B2 | 2/2007 | Reddy | |
| 7,284,611 B2 | 10/2007 | Reddy | |
| 7,424,914 B2 | 9/2008 | Reddy | |
| 7,442,249 B2 | 10/2008 | Mueller | |
| 7,488,705 B2 | 2/2009 | Reddy | |
| 7,537,054 B2 | 5/2009 | Reddy | |
| 7,612,021 B2 | 11/2009 | Chatterji | |
| 7,631,692 B2 | 12/2009 | Roddy | |
| 7,647,970 B2 | 1/2010 | Mueller | |
| 7,743,828 B2 | 6/2010 | Roddy et al. | |
| 7,762,329 B1 | 7/2010 | Morgan | |
| 7,867,954 B2 | 1/2011 | Warrender et al. | |
| 7,942,964 B2 * | 5/2011 | Luo et al. | 106/713 |
| 8,012,582 B2 | 9/2011 | Luo | |
| 8,062,999 B2 | 11/2011 | Reddy | |
| 8,123,852 B2 | 2/2012 | Reddy | |
| 8,183,186 B2 | 5/2012 | Luo | |
| 8,261,833 B2 | 9/2012 | Desai | |
| 8,281,859 B2 | 10/2012 | Brenneis | |
| 8,297,357 B2 | 10/2012 | Brenneis et al. | |
| 2002/0069791 A1 * | 6/2002 | Merkley et al. | 106/657 |
| 2004/0107877 A1 | 6/2004 | Getzlaf | |
| 2004/0194960 A1 | 10/2004 | DiLullo | |
| 2005/0166803 A1 | 8/2005 | Dillenbeck | |
| 2009/0137431 A1 | 5/2009 | Reddy | |
| 2010/0258312 A1 | 10/2010 | Brenneis | |
| 2010/0282466 A1 | 11/2010 | Brenneis | |
| 2011/0073311 A1 | 3/2011 | Porcherie | |
| 2011/0100626 A1 | 5/2011 | Brenneis | |
| 2012/0145393 A1 | 6/2012 | Roddy | |
| 2012/0152539 A1 | 6/2012 | Karcher | |
| 2012/0167803 A1 | 7/2012 | Luo | |
| 2012/0227631 A1 | 9/2012 | Brenneis | |

FOREIGN PATENT DOCUMENTS

| | | |
|---|---|---|
| CN | 1443727 | 9/2003 |
| EP | 1853680 B1 | 4/2010 |
| EP | 2273063 A1 | 1/2011 |
| EP | 1769132 B1 | 4/2011 |
| JP | 55027881 | 2/1990 |
| KR | 1126647 | 3/2012 |
| WO | WO 95/27122 A1 | 10/1995 |
| WO | WO 2010/086592 A1 | 8/2010 |

OTHER PUBLICATIONS

Halliburton Brochure "D-Air 4000L™ Cementing Defoamer" dated Sep. 2007.
Halliburton Brochure "CFR-3™ and CFR-3L™ Dispersant" dated Apr. 2012.
Halliburton Brochure "HR®-5" dated Aug. 2007.
Hess Pumice Products, Inc., Fact Sheet "DS-200, DS-325, Ultrafine Grout" not dated but admitted as prior art.
UPSTO Office Action for U.S. Appl. No. 13/849,309, dated Jul. 2, 2013.

* cited by examiner

Primary Examiner — Paul Marcanton
(74) Attorney, Agent, or Firm — Craig W. Roddy; Tumey L.L.P.

(57) ABSTRACT

Methods and compositions are provided that relate to cementing operations, including a method of cementing that may comprise providing a settable composition that may comprise wollastonite, pumice, a calcium-ion source, and water, wherein the wollastonite may be present in an amount in a range of from about 25% to about 75% by combined weight of the wollastonite and pumice, and wherein the pumice may be present in an amount in a range of from about 25% to about 75% by combined weight of the wollastonite and pumice. Embodiments of the method further may comprise allowing the settable composition to set.

20 Claims, No Drawings

SETTABLE COMPOSITIONS COMPRISING WOLLASTONITE AND PUMICE AND METHODS OF USE

BACKGROUND

The present invention relates to cementing operations and, more particularly, in certain embodiments, to settable compositions comprising wollastonite and pumice and associated methods of use in cementing operations.

In cementing operations, such as well construction and remedial cementing, settable compositions are commonly utilized. As used herein, the term "settable composition" refers to a composition that hydraulically sets or otherwise develops compressive strength. Settable compositions may be used in primary cementing operations whereby pipe strings, such as casing and liners, are cemented in well bores. In a typical primary cementing operation, a settable composition may be pumped into an annulus between the walls of the well bore and the exterior surface of the pipe string disposed therein or between the pipe string and a larger conduit in the subterranean formation. The settable composition may set in the annular space, thereby forming an annular sheath of hardened, substantially impermeable material (e.g., a cement sheath) that may support and position the pipe string in the well bore and may bond the exterior surface of the pipe string to the well bore walls or to larger conduit. Among other things, the cement sheath surrounding the pipe string should function to prevent the migration of fluids in the annulus, as well as protecting the pipe string from corrosion. Settable compositions also may be used in remedial cementing methods, such as in the placement of plugs and in squeeze cementing for sealing voids in a pipe string, cement sheath, gravel pack, subterranean formation, and the like.

A particular challenge in cementing operations is the development of satisfactory mechanical properties in a settable composition within a reasonable time period after placement in the subterranean formation. During the life of a well, the subterranean cement sheath undergoes numerous strains and stresses as a result of temperature effects, pressure effects, and impact effects. The ability to withstand these strains and stresses is directly related to the mechanical properties of the settable composition after setting. The mechanical properties are often characterized using parameters such as compressive strength, tensile strength, Young's Modulus, Poisson's Ratio, elasticity, and the like. These properties may be modified by the inclusion of additives.

One type of settable composition that has been used comprises Portland cement as the cementitious component. Portland cement is one of the more common cementitious components used throughout the world and is usually produced by a process that comprises sintering a mixture of a predetermined composition and then grinding the resulting Portland cement clinker. While Portland cement has been used in well construction and remedial cementing for a number of years, drawbacks to Portland cement include the energy requirements to produce Portland cement. These energy requirements greatly increase the cost of creating Portland cement. Efforts to reduce the cost of settable compositions have come in the form of replacing Portland cement with other solid particulate components.

SUMMARY

An embodiment discloses a method of cementing. Embodiments of the method may comprise providing a settable composition that may comprise wollastonite, pumice, a calcium-ion source, and water, wherein the wollastonite may be present in an amount in a range of from about 25% to about 75% by combined weight of the wollastonite and pumice, and wherein the pumice may present in an amount in a range of from about 25% to about 75% by combined weight of the wollastonite and pumice. Embodiments of the method further may comprise allowing the settable composition to set.

Another embodiment discloses a method of cementing. Embodiments of the method may comprise preparing a base fluid that may comprise water and lime. Embodiments of the method further may comprise preparing a dry blend that may comprise wollastonite and pumice, wherein the wollastonite may be present in an amount in a range of from about 25% to about 75% by combined weight of the wollastonite and pumice, wherein the pumice may be present in an amount in a range of from about 25% to about 75% by combined weight of the wollastonite and pumice. Embodiments of the method further may comprise combining the base fluid and the dry blend to form a settable composition that is essentially free of Portland cement. Embodiments of the method further may comprise introducing the settable composition into a subterranean formation. Embodiments of the method further may comprise allowing the composition to set in the subterranean formation.

Another embodiment discloses a settable composition that may comprise wollastonite, pumice, a calcium-ion source, water, wherein the wollastonite may be present in an amount in a range of from about 25% to about 75% by combined weight of the wollastonite and pumice, and wherein the pumice may be present in an amount in a range of from about 25% to about 75% by combined weight of the wollastonite and pumice.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the present invention disclose settable compositions comprising wollastonite, pumice, a calcium-ion source, and water. One of the many potential advantages of embodiments of the settable compositions is that use of wollastonite and pumice may provide the settable compositions with adequate compressive strengths for use in subterranean applications without the need of Portland cement. By way of example, the compressive strength of the settable compositions containing wollastonite and pumice may be equal to or greater than a settable composition in which the wollastonite and pumice has been replaced with Portland cement. Accordingly, embodiments of the settable compositions may be used in a variety of subterranean applications where settable compositions may be used, including, but not limited to, primary and remedial cementing.

In some embodiments, the settable compositions may comprise wollastonite. Wollastonite is generally a calcium inosilicate mineral used in industrial applications, such as ceramics, friction products, metal making, paint filler, and plastics. Wollastonite may be mined in a number of different locations throughout the world and then processed for use in industrial applications. Wollastonite may be considered a cementitious component as it sets and hardens in the presence of silica, lime and water. Wollastonite used in embodiments of the present invention may have a mean particle size in a range of from about 1 microns to about 200 microns, and, alternatively, from about 5 microns to about 100 microns. The wollastonite may be included in embodiments of the settable compositions in an amount suitable for a particular application. In some embodiments, the wollastonite may be present in the settable compositions in an amount in a range of from about 25% to about 75% by combined weight of the wollastonite and pumice. In particular embodiments, the wollastonite may be present in an amount ranging between any of and/or including any of about 25%, about 30%, about 40%, about 50%, about 60%, about 70%, or about 75% by combined weight of the wollastonite and pumice. One of ordinary skill, with the benefit of this disclosure, should recognize the amount of the wollastonite to include for a chosen application.

In some embodiments, the settable compositions may comprise pumice. Generally, pumice is a volcanic rock that exhibits cementitious properties, in that it may set and harden in the presence of lime and water. Pumice may be mined in a number of different locations throughout the world and then processed for use in industrial applications. Pumice used in embodiments of the present invention may have a mean particle size in a range of from about 1 microns to about 50 microns, and, alternatively, from about 1 microns to about 20 microns. An example of a suitable pumice is available from Hess Pumice Products, Inc., Malad City, Id., under the trade name DS-200 having an average particle size of less than 20 microns. The pumice may be included in embodiments of the settable compositions in an amount suitable for a particular application. In some embodiments, the pumice may be present the settable compositions in an amount in the range of from about 25% to about 75% by combined weight of the wollastonite and pumice. In some embodiments, the pumice may be present in an amount ranging between any of and/or including any of about 25%, about 30%, about 40%, about 50%, about 60%, about 70%, or about 75% by combined weight of the wollastonite and pumice. One of ordinary skill in the art, with the benefit of this disclosure, should recognize the appropriate amount of the pumice to include for a chosen application.

In some embodiments, the settable compositions may comprise a calcium-ion source. The calcium-ion source may be included in the settable compositions for providing calcium ions for reaction with the wollastonite and/or pumice, for example. One example of a suitable calcium-ion source comprises lime. As used herein, the term "lime" is intended to include calcium oxide, calcium hydroxide, or a combination thereof. In some embodiments, the calcium-ion source may be present in the settable compositions in an amount in the range of about 0.1% to about 15% by combined weight of the wollastonite and pumice. In further embodiments, the calcium-ion source may be included in an amount in the range of from about 1% to about 10% by combined weight of the wollastonite and pumice.

In some embodiments, the settable compositions may further comprise hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolanic cements, gypsum cements, high alumina content cements, silica cements, and any combination thereof. In certain embodiments, the hydraulic cement may comprise a Portland cement. Portland cements that may be suited for use in example embodiments may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III.

Where present, the hydraulic cement generally may be included in the settable compositions in an amount sufficient to provide the desired compressive strength, density, and/or cost. In some embodiments, the hydraulic cement may be present the settable compositions in an amount in the range of from about 0.1% to about 50% by combined weight of the wollastonite and pumice. For example, the hydraulic cement may be present in an amount ranging between any of and/or including any of about 0.1%, about 1%, about 5%, about 10%, about 20%, about 30%, about 40%, or about 50% by combined weight of the wollastonite and pumice. In some embodiments, the hydraulic cement may be included in an amount that does not exceed about 1%, does not exceed about 5% bwoc, does not exceed about 10%, does not exceed about 20%, does not exceed about 30%, does not exceed about 40%, or does not exceed about 50% by combined weight of the wollastonite and pumice.

In some embodiments, the settable compositions may be essentially free of any additional cementitious components, such as the hydraulic cement described herein (e.g., contains less than about 1% by combined weight of the wollastonite and pumice). In particular embodiments, the settable compositions may be essentially free of, or even free of, Portland cement. In some embodiments, the settable compositions may comprise additional cementitious components, such as the hydraulic cement, in an amount less than about 1% by combined weight of the wollastonite and pumice and, alternatively, less than about 0.1% by combined weight of the wollastonite and pumice.

In some embodiments, the settable compositions may further comprise a dispersant. Where present, the dispersant should act, among other things, to control the theology of the settable composition. While a variety of dispersants known to those skilled in the art may be used in accordance with the present invention, examples of suitable dispersants include naphthalene sulfonic acid condensate with formaldehyde; acetone, formaldehyde, and sulfite condensate; melamine sulfonate condensed with formaldehyde; any combination thereof. Where used, the dispersant should be present in embodiments of the settable compositions in an amount sufficient to prevent gelation of the settable composition and/or improve rheological properties. In some embodiments, the dispersant may be present in the settable compositions in an amount in the range of from about 0.1% to about 5% by combined weight of the wollastonite and pumice.

The water used in embodiments of the settable compositions of the present invention may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the settable composition. In some embodiments, the water may be included in an amount sufficient to form a pumpable slurry. In some embodiments, the water may be included in the settable compositions in an amount in a range of from about 40% to about 200% by combined weight of the wollastonite and pumice. In some embodiments, the water may be included in an amount in a range of from about 40% to about 150% by combined weight of the wollastonite and pumice.

Other additives suitable for use in subterranean cementing operations may also be added to embodiments of the settable compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, fluid-loss-control additives, foaming additives, thixotropic additives, and any combination thereof. Specific examples of these, and other, additives include crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, any combination thereof, and the like. A person having ordinary skill in the art, with the benefit of this disclosure, will readily be able to determine the type and amount of additive useful for a particular application and desired result.

Strength-retrogression additives may be included in embodiments of the settable composition to, for example, prevent the retrogression of strength after the settable composition has been allowed to develop compressive strength when the settable composition is exposed to high temperatures. These additives may allow the settable compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Set accelerators may be included in embodiments of the settable compositions to, for example, increase the rate of setting reactions. Control of setting time may allow for the ability to adjust to well bore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Set retarders may be included in embodiments of the settable compositions to, for example, increase the thickening time of the settable compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Weighting agents may be included in embodiments of the settable compositions to for example, increase the density of the settable compositions. Examples of suitable weighting agents include, but not limited to, ground barium sulfate, barite, hematite, calcium carbonate, siderite, llmenite, magnesium oxide, sand, salt, or a combination thereof.

Lightweight additives may be included in embodiments of the settable compositions to, for example, decrease the density of the settable compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in embodiments of the settable compositions to release gas at a predetermined time, which may be beneficial to prevent gas migration from the formation through the settable composition before it hardens. The generated gas may combine with or inhibit the permeation of the settable composition by formation gas. Examples of suitable gas-generating additives include, but are not limited to, metal particles (e.g., aluminum powder) that react with an alkaline solution to generate a gas.

Mechanical-property-enhancing additives may be included in embodiments of the settable compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in embodiments of the settable compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls.

Fluid-loss-control additives may be included in embodiments of the settable compositions to, for example, decrease the volume of fluid that is lost to the subterranean formation. Properties of the settable compositions may be significantly influenced by their water content. The loss of fluid can subject the settable compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropane-sulfonic acid, acrylonitrile, and N,N-dimethylacrylamide.

Foaming additives may be included in embodiments of the settable compositions to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

Defoaming additives may be included in embodiments of the settable compositions to, for example, reduce tendency for the settable composition to foam during mixing and pumping of the settable compositions. Examples of suitable defoaming additives include, but are not limited to, polyol silicone compounds. Suitable defoaming additives are available from Halliburton Energy Services, Inc., under the product name "D-AIR™" defoamers.

Thixotropic additives may be included in embodiments of the settable compositions to, for example, provide a settable composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration.

Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that embodiments of the settable compositions generally should have a density suitable for a particular application. By way of example, embodiments of the settable compositions may have a density of about 4 pounds per gallon ("lb/gal") to about 17 lb/gal. In certain embodiments, the settable compositions may have a density of about 8 lb/gal to about 17 lb/gal. Embodiments of the settable compositions may be foamed or unfoamed or may comprise other means to reduce their densities, such as lightweight additives. In addition, embodiments of the settable composition may comprise weightings agents or other means to increase their densities. Those of ordinary skill in the art, with the benefit of this disclosure, will recognize the appropriate density for a particular application.

The components of the settable composition may be combined in any order desired to form a settable composition that can be placed into a subterranean formation. In addition, the components of the settable compositions may be combined using any mixing device compatible with the composition, including a bulk mixer, for example. In some embodiments, the settable compositions may be prepared by combining the wollastonite and pumice with water. Other additives may be combined with the water before it is added to the wollastonite. For example, a base fluid may be prepared that comprises a cement dispersant, a calcium-ion source, and water, wherein the base fluid is then combined with the wollastonite. In some embodiments, the wollastonite and pumice may be dry blended prior to their combination with the water. In some embodiments, the calcium-ion source may be dry blended with the wollastonite and pumice. Other suitable techniques may be used for preparation of the setting compositions as will be appreciated by those of ordinary skill in the art in accordance with embodiments of the present invention.

Embodiments of the settable compositions may be used in a variety of subterranean applications, including primary and remedial cementing, among others. Embodiments may include providing a settable composition and allowing the settable composition to set. Embodiments of the settable compositions may comprise, for example, wollastonite, pumice, a calcium-ion source, and water. As used herein, introducing the settable composition into a subterranean formation includes introduction into any portion of the subterranean formation, including, without limitation, into a well bore drilled into the subterranean formation, into a near well bore region surrounding the well bore, or into both.

In primary-cementing embodiments, for example, a settable composition may be introduced into a well-bore annulus; and allowed to set in the well-bore annulus to form a hardened mass. The well-bore annulus may include, for example, an annular space between a conduit (e.g., pipe string, liner, etc.) and a wall of a well bore or between the conduit and a larger conduit in the well bore. Generally, in most instances, the hardened mass should fix the conduit in the well bore.

In remedial-cementing embodiments, a settable composition may be used, for example, in squeeze-cementing operations or in the placement of plugs. By way of example, the settable composition may be placed in a well bore to plug a void or crack in the formation, in a gravel pack, in the conduit, in the cement sheath, and/or a microannulus between the cement sheath and the conduit. In another embodiment, the settable composition may be placed into a well bore to form a plug in the well bore with the plug, for example, sealing the well bore.

EXAMPLES

To facilitate a better understanding of the present invention, the following examples of certain aspects of some embodiments are given. In no way should the following examples be read to limit, or define, the entire scope of the invention.

Example 1

The following series of tests was performed to evaluate the mechanical properties of settable compositions comprising wollastonite and pumice. Six different settable compositions, labeled Samples 1-6, were prepared using the indicated amounts of water, wollastonite, pumice, lime, and a cement dispersant. The amounts of these components in each sample are indicated in the table below with "% by wt" indicating the percent of the component by combined weight of the wollastonite and pumice and gallon per sack ("gal/sk") indicating the gallons of the respective component per 94-pound sack of the wollastonite and pumice. The dispersant used was CFR-3™ cement friction reducer, from Halliburton Energy Services, Inc., Duncan, Okla.

After preparation, the settable compositions were allowed to cure for 48 hours in a 2"×4" metal cylinder that was placed in a water bath at 180° F. to form set cement cylinders. Immediately after removal from the water bath, destructive compressive strengths were determined using a mechanical press in accordance with API RP 10B-2. The results of this test are set forth in the table below.

TABLE 1

| Samples | Ingredients | | | | | | 48 hr |
| | Density lb/gal | Water gal/sk | Wollastonite % by wt | Pumice % by wt | Lime % by wt | Cement Dispersant % by wt | Temp ° F. | Comp. Strength PSI |
| --- | --- | --- | --- | --- | --- | --- | --- | --- |
| 1 | 14.2 | 5.59 | 30 | 70 | 5 | 0.5 | 180 | 519 |
| 2 | 14.2 | 5.85 | 40 | 60 | 5 | 0.5 | 180 | 550 |
| 3 | 14.2 | 6.11 | 50 | 50 | 5 | 0.5 | 180 | 452 |
| 4 | 14.2 | 6.14 | 50 | 50 | 5 | 0 | 180 | 234 |
| 5 | 14.2 | 6.35 | 50 | 50 | 10 | 0 | 180 | 272 |
| 6 | 14.2 | 6.79 | 75 | 25 | 5 | 0 | 180 | 170 |

Based on the results of these tests, settable compositions comprising wollastonite and pumice can develop acceptable compressive strengths. For example, in Sample 1, a compressive strength of 519 psi was obtained by including 30% bwoc wollastonite and 70% bwoc pumice. In Sample 2, a compressive strength if 550 psi was acquired by including 40% bwoc wollastonite and 60% bwoc pumice.

Example 2

The following series of tests was performed to evaluate the fluid loss of settable compositions comprising wollastonite and pumice. Four different settable compositions, designated Samples 7-10, were prepared using the indicated amounts of water, wollastonite, pumice, lime, a cement dispersant, a cement retarder, and a fluid-loss-control additive. The amounts of these components in each sample are indicated in the table below with "% by wt" indicating the amount of the component by combined weight of the wollastonite and pumice and gallon per sack ("gal/sk") indicating the gallons of the respective component per 94-pound sack of the wollastonite and pumice. The cement dispersant was CFR®-3 cement dispersant from Halliburton Energy Services, Inc. The cement retarder was HR®-5 cement retarder from Halliburton Energy Services, Inc. The fluid-loss-control additive was Halad™-344 from Halliburton Energy Services, Inc.

After preparation, the sample settable compositions were poured into a pre-heated cell with a 325-mesh screen and a fluid-loss test was performed for 30 minutes at 1,000 psi and 180° F. in accordance with API RP 1013-2. The results of this test are set forth in the table below, per sack ("gal/sk") indicating the gallons of the respective component per 94-pound sack of the wollastonite and pumice. The settable compositions had a density of 14.2 lb/gal. The cement dispersant was CFR®-3 cement dispersant from Halliburton Energy Services, Inc. The cement set retarder used was HR®-5 retarder, from Halliburton Energy Services, Inc., Duncan, Okla. After preparation, the thickening times, which is the time required for the compositions to reach 70 Bearden units of consistency, were determined at 180° F. in accordance with API RP 10B-2

TABLE 3

| | Ingredients | | | | | | | |
|---|---|---|---|---|---|---|---|---|
| Samples | Density lb/gal | Water gal/sk | Wollastonite % by wt | Pumice % by wt | Lime % by wt | Cement Dispersant % by wt | Cement Retarder % by wt | Thickening Time hr:min |
| 11 | 14.2 | 5.83 | 40 | 60 | 5 | 0.5 | 0.5 | 12:00+ |
| 12 | 14.2 | 5.84 | 40 | 60 | 5 | 0.5 | 0.25 | 6:23 |
| 13 | 14.2 | 5.84 | 40 | 60 | 5 | 0.5 | 0.1 | 2.42 |

As illustrated, settable compositions comprising wollastonite and pumice may have acceptable thickening times. For example, thickening times from over 12 hours to just under 2.5 hours were seen in Samples 11 and 13, respectively.

Example 4

The following series of tests was performed to further evaluate the compressive strength of settable compositions comprising wollastonite and pumice. A single settable composition, labeled Sample 14, was prepared using the indicated amounts of water, wollastonite, pumice, lime, a cement dispersant, and a cement set retarder. The amounts of these components in each sample are indicated in the table below

TABLE 2

| | Ingredients | | | | | | | |
|---|---|---|---|---|---|---|---|---|
| Sample | Density lb/gal | Water gal/sk | Wollastonite % by wt | Pumice % by wt | Lime % by wt | Cement Dispersant % by wt | Cement Retarder % by wt | Fluid-Loss-Control Additive % by wt | API Fluid Loss[1] cc/30 min |
| 7 | 14.2 | 5.83 | 40 | 60 | 5 | 0.5 | 0.5 | 0.25 | 87.8 |
| 8 | 14.2 | 5.81 | 40 | 60 | 5 | 0.5 | 0.5 | 0.5 | 152.4 |
| 9 | 13.8 | 6.58 | 40 | 60 | 5 | 0.5 | 0.5 | 0.5 | 127 |
| 10 | 14.2 | 5.80 | 40 | 60 | 5 | 0.5 | 0.5 | 0.75 | 117.1 |

[1]Calculated API Fluid Loss

As illustrated, settable compositions comprising wollastonite and pumice may have acceptable fluid-loss control For example, API fluid loss of less than or equal to 117 cc/30 min were obtained for Samples 7 and 10.

Example 3

The following series of tests was performed to evaluate the thickening time of settable compositions comprising wollastonite and pumice. Three different settable compositions, labeled Samples 11-13, were prepared using the indicated amounts of water, wollastonite, pumice, lime, a cement dispersant, and a cement set retarder. The amounts of these components in each sample are indicated in the table below with "by wt" indicating the amount of the component by combined weight of the wollastonite and pumice and gallon with "% by wt" indicating the amount of the component by combined weight of the wollastonite and pumice and gallon per sack ("gal/sk") indicating the gallons of the respective component per 94-pound sack of the cementitious component. The settable composition had a density of 14.2 lb/gal. The cement set retarder used was HR®-5 retarder, from Halliburton Energy Services, Inc., Duncan, Okla.

After preparation, the 24-hour and 48-hour compressive strengths were determined for the sample settable composition using an Ultrasonic Cement Analyzer ("UCA"), available from Fann Instrument Company, Houston, Tex. In the UCA, the sample cement compositions were cured at 180° F. while maintained at 3000 psi. After removal from the UCA, the destructive compressive strength of the sample was determined using a mechanical press in accordance with API RP 10B-2.

TABLE 4

| Sample | Density lb/gal | Water gal/sk | Ingredients Wollastonite % by wt | Pumice % by wt | Lime % by wt | Cement Dispersant % by wt | Cement Retarder % by wt | UCA 24-Hour Comp. Strength PSI | UCA 48-Hour Comp. Strength PSI | 48-Hour Comp. (Crush) Strength PSI |
|---|---|---|---|---|---|---|---|---|---|---|
| 14 | 14.2 | 5.84 | 40 | 60 | 5 | 0.5 | 0.25 | 832 | 900 | 568 |

Accordingly, Table 4 indicates that acceptable compressive strengths may be obtained for settable compositions comprising wollastonite and pumice. For example, a compressive strength of 900 PSI was obtained at 48 hours in Sample 14.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing comprising:
    providing a settable composition comprising:
        wollastonite;
        pumice;
        a calcium-ion source in an amount in a range of from about 0.1% to about 25% by combined weight of the wollastonite and pumice; and
        water in an amount in a range of from about 40% to about 200% by combined weight of the wollastonite and pumice;
        wherein the wollastonite is present in an amount in a range of from about 25% to about 75% by combined weight of the wollastonite and pumice; and
        wherein the pumice is present in an amount in a range of from about 25% to about 75% by combined weight of the wollastonite and pumice;
    introducing the settable composition into a subterranean formation; and
    allowing the settable composition to set.

2. The method of claim 1, wherein the settable composition has a density in a range of from about 12 pounds per gallon to about 20 pounds per gallon.

3. The method of claim 1, wherein the water is present in an amount in a range of from about 40% to about 150% by combined weight of the wollastonite and pumice.

4. The method of claim 1, wherein the calcium-ion source comprises lime.

5. The method of claim 1, wherein the calcium-ion source is present in an amount in a range of from about 0.1% to about 15% by combined weight of the wollastonite and pumice.

6. The method of claim 1, wherein the settable composition further comprises an additive selected from the group consisting of a dispersant, a strength-retrogression additive, a set accelerator, a set retarder, a weighting agent, a lightweight additive, a gas-generating additive, a mechanical property enhancing additive, a lost-circulation material, a fluid loss control additive, a foaming additive, a defoaming additive, a thixotropic additive, and any combination thereof.

7. The method of claim 1, wherein the settable composition further comprises an additive selected from the group consisting of crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, any combination thereof.

8. The method of claim 1, wherein the settable composition is free of any additional cementitious materials.

9. The method of claim 1, wherein the settable composition is free of Portland cement.

10. The method of claim 1, wherein the settable composition is introduced into a well bore annulus.

11. The method of claim 1, wherein the settable composition is allowed to set in a well-bore annulus.

12. The method of claim 1, wherein the settable composition is used in primary cementing.

13. The method of claim 1, wherein the settable composition is used in remedial cementing.

14. A method of cementing comprising:
    providing a settable composition, wherein the providing the settable composition comprises:
        preparing a base fluid comprising water and lime;
        preparing a dry blend comprising wollastonite and pumice, wherein the wollastonite is present in an amount in a range of from about 25% to about 75% by combined weight of the wollastonite and pumice, wherein the pumice is present in an amount in a range of from about 25% to about 75% by combined weight of the wollastonite and pumice;

combining the base fluid and the dry blend to form the settable composition that is free of Portland cement;

introducing the settable composition into a subterranean formation; and allowing the settable composition to set.

15. The method of claim 14, wherein the lime is present in the settable composition in an amount in a range of from about 0.1% to about 25% by combined weight of the wollastonite and pumice.

16. The method of claim 14, wherein the settable composition is allowed to set in a well-bore annulus.

17. The method of claim 14, wherein the settable composition is used in primary cementing.

18. The method of claim 14, wherein the settable composition is used in remedial cementing.

19. The method of claim 14, wherein the water is present in an amount in a range of from about 40% to about 200% by combined weight of the wollastonite and pumice.

20. The method of claim 14, wherein the settable composition is introduced into a well bore annulus.

* * * * *